Oct. 15, 1968     P. M. KOBREHEL     3,405,971
INERTIALLY RESPONSIVE SEAT LOCK FOR FOLDING VEHICLE SEAT BACKS
Filed May 22, 1967
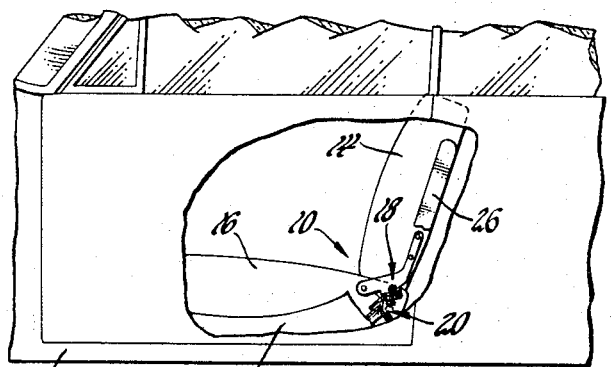
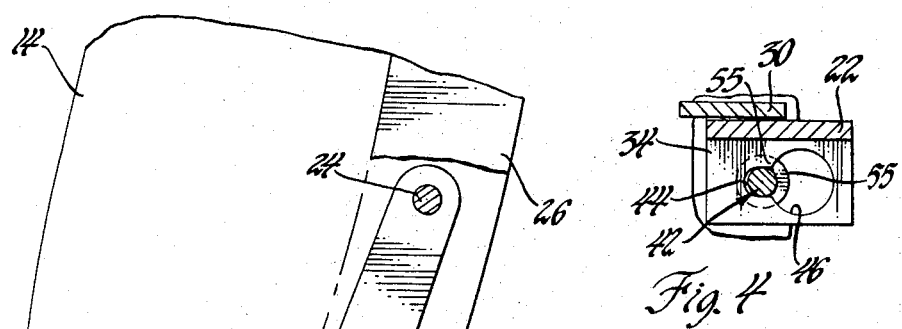
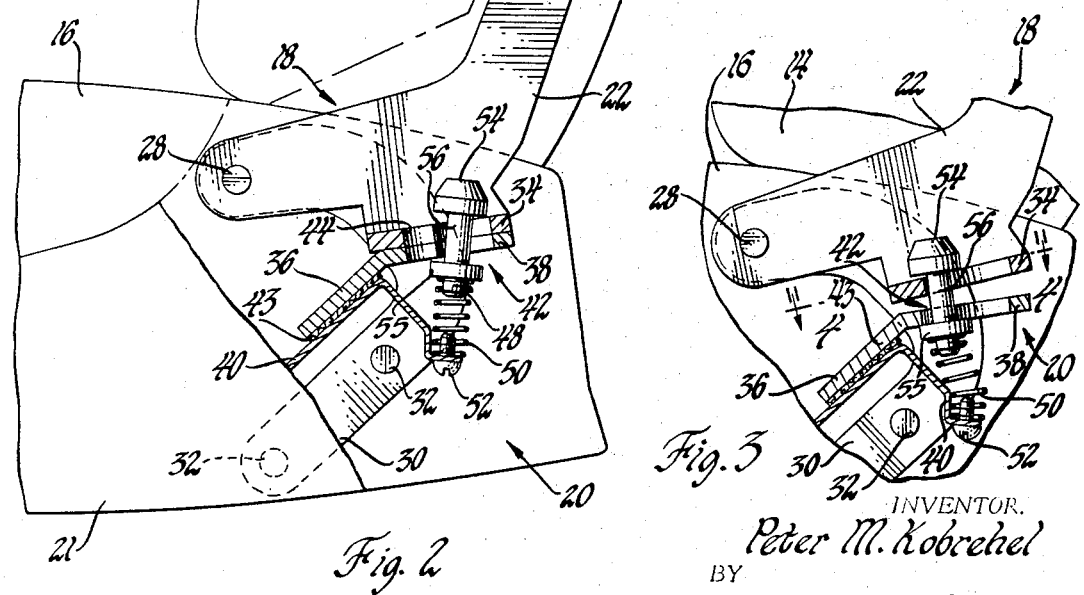
INVENTOR.
Peter M. Kobrehel
BY
E. J. Biskup
ATTORNEY United States Patent Office 3,405,971
Patented Oct. 15, 1968

3,405,971
INERTIALLY RESPONSIVE SEAT LOCK FOR FOLDING VEHICLE SEAT BACKS
Peter M. Kobrehel, Warren, Mich., assignor to General Motors Corporation, Detroit, Mich., a corporation of Delaware
Filed May 22, 1967, Ser. No. 639,957
8 Claims. (Cl. 297—216)

ABSTRACT OF THE DISCLOSURE

A seat lock for a folding vehicle seat back wherein a locking member is supported by a flexible member and adapted to move forwardly, due to inertial forces, within slots formed in stop plates attached to the seat back and seating cushion, respectively. The locking member includes head portions that overlap the slots to limit pivotal movement of the seat back upon rapid deceleration of the vehicle.

---

Manually and automatically operated mechanisms have been proposed or used in the past to prevent the seat backs that are conventionally installed in two-door vehicles from folding forwardly during periods of rapid deceleration. The manual mechanisms are usually in a normally locked condition and require the operator to shift or depress a lever to unlock the mechanism when it is desired to pivot the seat back. Unless the lever is located within easy reach of the operator, entry to and exit from the rear seating compartment may be difficult and time consuming. Ideally, the seat lock should be operative only during the decelerating period. Inertially actuated devices incorporating an inertial wheel, that upon sudden deceleration swings forwardly and causes a pawl to engage notches thereby locking the seat back, have been used to eliminate the necessity of manually unlocking the seat back. However, these devices are complex and subject to maintenance problems when exposed to dirt and contaminants. Pendulum arrangements have also been used and, while functionally successful, they are not readily adaptable for automotive use because of the large and cumbersome construction.

A seat back lock made in accordance with the present invention overcomes drawbacks of complexity and size by providing a compact inertially responsive latching mechanism that may be easily incorporated within the confines of a conventional seating unit. The latching mechanism uses a yieldable spring support for a locking member. During periods of rapid deceleration, the locking member moves forwardly into rearwardly opening slots formed in stop plates that are attached to the seat back and seating cushion, respectively. The locking member includes enlarged axially spaced head portions that overlap the slots to limit pivotal movement of the seat back during the aforementioned deceleration period. Under normal conditions, the locking member is located to the rear of the slots and does not interfere with the folding of the seat back.

Accordingly, the objects of the invention are: to provide a compact inertially responsive latching arrangement for a folding vehicle seat; to provide an acceleration responsive locking arrangement for a folding vehicle seat that may be easily incorporated within the confines of existing seat structures; and to provide a locking arrangement for a conventional folding vehicle seat back wherein a locking member, supported by a spring, moves forwardly into slots formed in stop plates attached to the seat back and seating cushion due to inertial forces encountered during periods of rapid deceleration, the locking member having enlarged head portions that overlap the slots to limit relative separation of the stop plates.

These and other objects of the present invention will become apparent to one skilled in the art upon reading the following detailed description, reference being made to the accompanying drawing in which:

FIGURE 1 is a partial side view of a vehicle seating unit using a locking mechanism made in accordance with the present invention;

FIGURE 2 is an enlarged partial cross-sectional view showing the seating unit of FIGURE 1 in the unlocked position;

FIGURE 3 is a partial view similar to FIGURE 2 showing the seating unit in a latched position; and FIGURE 4 is a cross-sectional view taken along the line 4—4 in FIGURE 3.

Referring now to FIGURE 1, a seating unit 10 is shown conventionally mounted within the interior of a vehicle 12 and comprises a seat back 14, a seating cushion 16, a hinge mechanism 18, and a latching mechanism 20. The invention is designed for conventional two-door vehicles having twin independently operable folding front seat backs 14 and will be understood to include a pair of hinge mechanisms 18 for each seat back 14. In the described embodiment and as shown in FIGURE 2, the latching mechanism 20 is located adjacent the outboard hinges although it will be understood that the latching mechanism 20 could be incorporated with all of the hinges or merely the inboard hinges. A seat trim base 21 encircles the seating cushion 16 to enclose the hinge mechanism 18 and the latching mechanism 20 within the contours of the seat assembly 10.

As shown in FIGURE 2, the hinge mechanism 18 includes an upper hinge bracket 22 conventionally attached at points 24 to the frame 26 of the seat back 14 and pivotally connected at pin 28 to a hinge bracket 30, conventionally attached at points 32 to the seating cushion 16, so that the seat back 14 is hinged for pivotal movement about a transverse axis. The seating cushion 16 may be connected to the floor of the vehicle by any suitable means such as a conventional seat adjuster, not shown.

The latching mechanism 20 comprises an outwardly extending stop plate 34 formed integrally with the hinge bracket 22, a bumper member 36 including a stop plate 38 attached to the seating cushion frame 40, and a locking member 42. In conjunction with a shim member 43, the bumper member 36 is positioned so that the stop plates 34 and 38 are transversely and longitudinally aligned and stop plate 34 engages stop plate 38 to establish a normal seating position for the seat back 14.

As shown in FIGURE 4, rearwardly opening slots 44 of a predetermined width are formed in the stop plates 34 and 38 and are inter-connected by apertures 46 of a substantially greater size and, in the normal seating position, the slots and apertures register with each other in an aligned position. The locking member 42, inserted through apertures 46 and normally located to the rear of slots 44, has a lower end 48 supported by a vertically orientated coiled spring 50 that is anchored by a screw 52 to the seating cushion frame 40. While the locking member 42 may take various forms, the preferred embodiment comprises a bolt having a weighted head portion 54 including threaded stem portion 56 and a lower enlarged head 55 threaded over the stem portion 56. The upper and lower ends of the spring 50 are coiled over the threads of the stem portion 56 and screw 52, respectively. The head portions 54 and 55 are axially spaced a distance slightly greater than the thickness of stop plate 34 and 38 and have diameters slightly less than the size of aperture 46. The stem portion 56 normally is aligned with the slots 44 and is receivable therewithin upon forward movement of the locking member 42.

As should be apparent from the above description, this structure is responsive to inertial forces, so that upon deceleration of the vehicle, the stem portion 56 of the locking member 42 will move forwardly into the slots 44 and, as shown in FIGURES 3 and 4, the head portions 54 and 55 will overlap the slots 44 so that pivotal movement of the seat back 14 about pins 28 is prevented. By proper selection of the size of the head portion 54 and the stiffness of the spring 50, the locking member 42 can be designed to move toward the slots 44 at predetermined deceleration levels. While this preferred embodiment uses a latching mechanism 20 located adjacent the hinge mechanism 18, it should be apparent that the same may be successfully incorporated between the inboard and the outboard hinges. Also, it will be noted that the operation described above could be achieved by suspending locking member 42 from the seat back 14 rather than supporting the same from the seating cushion 16 as described above.

Since other changes and modifications will be obvious to one skilled in the art, the invention, as defined in the appended claims, is intended to cover such alterations of the described embodiment.

What is claimed is:

1. A seat lock for a vehicle seat having a seat back hinged to a fixed seating cushion for forward pivotal movement about a transverse axis from a normal seating position, comprising a first stop plate connected to the seat back, a second stop plate connected to the seating cushion, said first stop and said second stop plate having rearwardly opening slots formed therein that are horizontally and laterally aligned in the normal seating position, a vertically orientated spring member having one end connected to the seating cushion, a locking member normally located to the rear of the slots and having a pair of axially spaced enlarged head portions interconnected by a stem portion aligned with said slots and adapted to be received thereby, said locking member connected to and supported by the other end of the spring member whereby said locking member moves forwardly upon sudden deceleration of the vehicle and the stem portion enters and the head portions overlap said slots to limit separation of the stop plates.

2. The invention as recited in claim 1 wherein the first stop plate engages the second stop plate in the normal seating to prevent rearward pivotal movement about said transverse axis.

3. The invention as recited in claim 1 wherein the rearwardly opening slots are interconnected by apertures having a substantially greater size than the enlarged head portions.

4. The invention as recited in claim 3 wherein said locking member is located within said apertures in the normal seating position.

5. The invention as recited in claim 1 wherein said enlarged head members are adjustably axially spaced.

6. The invention as recited in claim 1 wherein said spring member is a coiled spring.

7. A seat lock for a vehicle seat having a seat back hinged to a fixed seating cushion for pivotal movement about a transverse axis, comprising stop plates connected to the seating cushion and the seat back adjacent the hinge axis and having slots of a predetermined width formed therein that register with each other when the seat back is in the normal seating position, a locking member having enlarged axially spaced head portions interconnected by a stem portion that is aligned with the slots and adapted to be received thereby, a spring member having a lower end connected to the seating cushion and an upper end connected to and yieldably supporting the locking member, said locking member moving forwardly upon sudden deceleration of the vehicle causing the stem portion to enter and the enlarged heads to laterally overlap the slots thereby limiting relative movement of the stop plates.

8. A seat lock for limiting relative movement from a normal seating relationship between vehicle seating members upon sudden deceleration of the vehicle, comprising a first hinge member connected to one of the seating members, a second hinge member connected to the other of the seating members, said hinge members pivotally connected for relative pivotal movement about a transverse axis, stop plates connected to each of said members and having rearwardly opening slots formed therein that register with each other when the seating members are in the normal seating relationship, a substantially vertically orientated spring member having one end connected to said one of said seating members, a locking member normally located to the rear of the slots and having a pair of axially spaced enlarged head portions interconnected by a stem portion that is aligned with the slots and adapted to be received thereby, said locking member connected to the other end of the spring member and moving forwardly upon sudden deceleration of the vehicle whereby the stem portion enters and the head portions overlap said slots to limit separation of the stop plates.

References Cited

UNITED STATES PATENTS

| 2,660,222 | 11/1953 | Woodsworth | 297—216 |
| 2,737,229 | 3/1956 | Semar | 297—379 |
| 3,028,198 | 4/1962 | Murr | 297—216 |

FOREIGN PATENTS

| 1,064,828 | 9/1959 | Germany. | |

FRANCIS K. ZUGEL, *Primary Examiner.*